United States Patent [19]
Hoeschele

[11] 3,933,759
[45] Jan. 20, 1976

[54] HEAT-ACTIVATABLE, STORAGE-STABLE POLYURETHANE POWDERS

[75] Inventor: Guenther Kurt Hoeschele, Wilmington, Del.

[73] Assignee: E. I. Du Pont de Nemours & Company, Wilmington, Del.

[22] Filed: Dec. 20, 1974

[21] Appl. No.: 535,135

[52] U.S. Cl. ............... 260/77.5 TB; 260/77.5 AA; 260/75 NT; 260/75 NE
[51] Int. Cl.² ..................................... C08G 18/80
[58] Field of Search ............... 260/77.5 TB, 75 NT, 77.5 AA, 260/75 NE

[56] References Cited
UNITED STATES PATENTS

| | | | |
|---|---|---|---|
| 3,236,812 | 2/1966 | McElroy | 260/75 |
| 3,770,703 | 11/1973 | Gruber et al. | 260/77.5 TB |
| 3,787,525 | 1/1974 | McGarr | 260/859 R |
| 3,846,378 | 11/1974 | Greswold | 260/77.5 TB |
| 3,857,818 | 12/1974 | Frizelle | 260/77.5 TB |

Primary Examiner—M. J. Welsh

[57] ABSTRACT

A heat-activatable polyurethane powder is prepared which contains about stoichiometric amounts of both blocked —NCO groups and active hydrogen-containing groups, the distribution of which is determined by the order in which the reactants are brought together. Typically an emulsified polymeric glycol (which may be admixed with more or less low molecular weight diol) reacts with a limited excess of diisocyanate to produce a dispersion of beads of —NCO-terminated polyurethane prepolymer; these in turn are reacted first with enough phenol or other monofunctional blocking agent to tie up about half of the free —NCO groups and secondly with one mole of a diamine or other difunctional active hydrogen compound per equivalent of the other half of the —NCO groups. When the resulting powder is coated upon a substrate and heated, the blocked —NCO groups are regenerated and thereupon they react with the active hydrogens available, resulting in the formation of a high molecular weight polyurethane film.

30 Claims, No Drawings

HEAT-ACTIVATABLE, STORAGE-STABLE POLYURETHANE POWDERS

BACKGROUND OF THE INVENTION

It is known to prepare thermoplastic polyurethanes directly in the form of powders by reacting polyether or polyester glycols and low molecular weight diols with diisocyanates in an inert solvent in which one of the reactants is immiscible and is emulsified by a surface active agent. These powders are useful as powder coatings and fabric adhesives, for example, and avoid the problems associated with solvents, but have the disadvantage that their processing temperatures are close to the temperature at which urethanes degrade. Having already attained their ultimate molecular weight, which must be relatively high to provide good physical properties, these thermoplastic polyurethanes have high melt viscosities at the maximum temperatures at which they can be processed. In many instances this high melt viscosity prevents proper flow during fusion of the powder. Thus a need exists for a powdered polyurethane which exhibits lower melt viscosities at temperatures sufficiently below the point of polymer degradation to permit less critical control of time/temperature cycles during fusion and still provide good physical properties.

BRIEF SUMMARY OF THE INVENTION

This invention is directed to polyurethane powders which are heat-activatable as well as thermoplastic, and are also storage-stable. More specifically the invention is directed to a storage-stable, heat-activatable polyurethane powder containing about stoichiometric amounts of blocked —NCO groups and free active hydrogen-containing groups. The invention also includes the preparation and direct recovery of these powders in the course of their synthesis and their subsequent heat-activation.

DETAILED DESCRIPTION OF THE INVENTION

These polyurethane powders comprise the reaction products of a. One mole of a polymeric glycol having a molecular weight of 400–4,000,
b. X moles of a diol having a molecular weight less than 250 wherein X = 0–20,
c. Y moles of an organic diisocyanate wherein Y = 1.03 (1 + X) to 1.60 (1 + X),
d. 0.03 (1 + X) to 0.60 (1 + X) moles of a monofunctional isocyanate blocking agent, and
e. Y − X − 1 moles of a difunctional active hydrogen compound, this reaction product being further characterized in that it is obtained directly as a powder having an average particle size of about 200 microns or less, from an inert organic solvent in which at least one of the reactants of the group (a) and (b) is immiscible and is emulsified in said solvent by means of a surface active agent. The heat-activatable property is achieved by selecting the amounts of reactants (d) and (e) so that the polyurethane powder contains about stoichiometric amounts of blocked —NCO groups and active hydrogen-containing groups.

The heat-activatable polyurethane powders of this invention exhibit the same high level of physical properties as do thermoplastic polyurethanes, but are superior in their melt flow characteristics.

Physically, the compositions of this invention are finely-divided powders the particles of which are bead-like; chemically they are polyurethanes of limited molecular weight which contain approximately stoichiometric amounts of blocked isocyanate groups and active hydrogen-containing groups. When activated by heat, these blocked —NCO groups are regenerated in the amount required to consume the active hydrogen available, resulting in the formation of a high molecular weight polyurethane which cannot be readily remelted without risking degradation. Specifically, control of melt viscosity at fusion temperatures which are safe is accomplished in the present invention by controlling the molecular weight of the heat-activatable intermediates, which in turn is controlled by the proportions of the reactants used. The amounts of reactants must also be selected so that the polyurethane powder contains about stoichiometric amounts of blocked —NCO groups and active hydrogen-containing groups.

In the polyurethane powders of this invention the distribution of blocked —NCO groups and active hydrogen-containing groups within individual powder particles can be varied widely as long as the powder compositions taken as a whole contain about equivalent numbers of reactive end groups. In one embodiment the powder consists of two kinds of particles, one kind containing blocked —NCO groups; the other, active hydrogen-containing groups. In another embodiment the powder consists of only one type of particle which contains about stoichiometric amounts of both blocked —NCO groups and active hydrogen-containing groups. These differences in the distribution of reactive groups are effected by the order in which the reactants are brought together as will be discussed in more detail hereinafter.

The polymeric glycols used in this invention have molecular weights of about 400–4,000. Glycols having molecular weights of about 600–2,000 are preferred. Useful polymeric glycols include the $C_2$–$C_8$ poly(alkylene oxide) glycols such as poly(ethylene oxide) glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, and poly(1,2-butylene oxide) glycol; also random or block copolymers of ethylene oxide and 1,2-propylene oxide, and polyformals prepared by reacting formaldehyde with diols as 1,4-butanediol or mixtures of diols such as a mixture of ethylene glycol and 1,4-butanediol.

In lieu of poly(alkylene oxide) glycols one may use polythioether glycols which can be considered as derivatives of poly(alkylene oxide) glycols in which some or all of the ether oxygens are replaced by sulfur atoms. Also useful are poly(alkylene-arylene oxide) glycols in which some of the alkylene oxide units of the poly(alkylene oxide) glycols are replaced by arylene oxide units.

Polyester glycols derived by esterification of one or more dicarboxylic acids such as succinic acid, adipic acid, suberic acid, phthalic acid and terephthalic acid with one or more diols such as ethylene glycol, 1,2- and 1,3-propylene glycol, 1,4-butanediol, neopentyl glycol, 1,6-hexanediol and diethylene glycol are particularly useful polymeric glycols. Common representatives of these polyester glycols include poly(ethylene adipate), poly(ethylene/1,2-propylene adipate) and poly(1,4-butylene adipate). Polyester glycols derived from lactones and hydroxyacids are also useful as polymeric glycols. Particularly useful glycols of this class are the poly(ε-caprolactone) glycols.

Long chain hydrocarbon glycols such as polybutadiene or polyisoprene glycols, copolymers of these, and saturated glycols.

Preferred polymeric glycols are (1) the poly(alkylene oxide) glycols, of which poly(tetramethylene oxide) glycol is especially preferred and (2) polyester glycols, of which poly(butylene adipate) glycol and poly(epsilon-caprolactone) glycol are especially preferred.

Included among the low molecular weight (less than about 250) diols which can be used in preparing the instant composition are acyclic and alicyclic dihydroxy compounds. Representative of these are diols with 2-15 carbon atoms such as ethylene, propylene, isobutylene, tetramethylene, pentamethylene, 2,2-dimethyltrimethylene, hexamethylene and decamethylene glycols, diethylene glycol, dihydroxy cyclohexane, and cyclohexane dimethanol. Aliphatic diols containing 2-8 carbon atoms are preferred, and 1,4-butanediol, ethylene glycol, neopentyl glycol, 1,6-hexanediol and diethylene glycol are especially preferred.

Aromatic, aliphatic, and cycloaliphatic diisocyanates can be used to prepare the compositions of the present invention, particularly the $C_8$-$C_{25}$ aromatics, $C_2$-$C_{18}$ aliphatics, and $C_5$-$C_{25}$ cycloaliphatics. Representative aromatic diisocyanates are 2,4-tolylene diisocyanate, 2,6-tolylene diisocyanate, 4,4'-methylenebis(phenyl)isocyanate), 1,3-phenylene diisocyanate, 1,5-naphtalene diisocyanate and mixtures thereof. Representative aliphatic diisocyanates are hexamethylene diisocyanate, xylylene diisocyanate, 1,12-dodecane diisocyanate and lysine ethyl ester diisocyanate. Representative cycloaliphatic diisocyanates are 4,4'-methylenebis(cyclyhexyl lisocyanate), 1,4-cyclohexylene diisocyanate, 1-methyl-2-4-hydrogenation products thereof are also satisfactory polymeric cyclohexylene diisocyanate and isophorone diisocyanate. Preferred diisocyanates are 2,4-tolylene diisocyanate, which can contain up to about 50%, 2,6-tolylene diisocyanate, 4,4'-methylenebis(phenyl isocyanate), and 4,4'-methylenebis(cyclohexyl isocyanate). Aliphatic and cycloaliphatic diisocyanates are preferred when non-discoloring compositions are required.

The difunctional active hydrogen compounds are preferably low molecular weight diols, diamines, and aminoalcohols. Of these, the diamines are preferred. Primary and secondary aliphatic, cycloaliphatic or aromatic diamines are useful in the present invention and include compounds such as ethylene diamine, hexamethylene diamine, piperazine, 1,3- or 1,4-diaminocyclohexane, 4,4'-methylenebis(cyclohexyl amine), 1-methyl-2,4-diaminocyclohexane, 2,4- and 2,6-tolylenediamine, 1,3- and 1,4-phenylene diamine, methylene dianiline, 1,5-napththalene diamine, N,N'-dimethylethylene diamine, and 4,4'-methylenebis(N-methylaniline). Aliphatic and cycloaliphatic amines are preferred when nondiscoloring products are required. Preferred diamines include ethylene diamine, hexamethylene diamine, 4,4'-methylenebis(cyclohexyl amine) and 1,3-phenylene diamine. As representative diols which can serve as the difunctional active hydrogen compound, any of the low molecular weight diols described hereinbefore may be used. Representative aminoalcohols include ethanolamine, N-ethylethanolamine, 2-hydroxypropylamine and 4-aminocyclohexanol.

The difunctional active hydrogen compounds are used in the present invention to provide the heat-activatable compositions with terminal active hydrogen-containing groups. The difunctional active hydrogen compounds are used in amounts such that at least a portion of them react with only one isocyanate group, leaving the second active hydrogen-containing group available for reaction during heat-activation. In the case of the preferred difunctional active hydrogen compounds; namely, diamines, diols and aminoalcohols, the active hydrogen-containing groups are amino groups and/or hydroxyl groups. The amount of difunctional active hydrogen compound required is described hereinafter.

The use of monofunctional isocyanate blocking agents to convert free —NCO groups to thermally unstable adducts which on heating yield back free —NCO groups is well known in urethane chemistry. The monofunctional isocyanate blocking agents which can be used in the present invention include aromatic hydroxy compounds such as phenol, cresol and alpha- and beta-naphthol, oximes such as methyl ethyl ketoxime, acetoxime and cyclohexanoneoxime; enol forms of 1,3-dicarbonyl compounds such as acetyl acetone and ethyl acetoacetate, lactams such as ε-caprolactam and diaryl amines such as diphenyl amine and N-phenyl-alpha-naphthylamine. Preferred blocking agents include ε-caprolactam and methyl ethyl ketoxime.

The ratio of polymeric glycol to low molecular weight diol (if any is employed) for a given set of materials affects the hardness and related physical properties of the final product after heat-activation. The greater the molar ratio of low molecular weight diol to polymeric glycol, the harder the resulting product. Up to 20 moles of low molecular weight diol can be used per mole of polymeric glycol.

The molar ratio of diisocyanate to the sum of the moles of polymeric glycol and low molecular weight diol also affects ultimate physical properties and more importantly establishes the molecular weight of the intermediate —NCO-terminated polymer. If the excess of diisocyanate is too low, the molecular weight will be too high for proper flow to occur during processing. Such products have substantially the same disadvantages as the prior art polyurethane powders which have achieved their maximum molecular weight prior to fusion. On the other hand, if the excess of diisocyanate is too high, very low molecular weight products result. These are often difficult to prepare in powder form by the present process. In addition, they are less stable in storage and may actually be too fluid initially when heat-activated.

It has been found that at least 1.03 and not more than 1.60 moles of diisocyanate should be employed per mole of the total of moles of polymeric glycol and low molecular weight diol. A preferred range is 1.07 to 1.40 moles of diisocyanate per total moles of dihydroxy compounds.

The moles of blocked isocyanate groups and free active hydrogen-containing groups should be about equal as previously stated. However, up to 20% excess of blocked isocyanate groups relative to the free active hydrogen-containing groups or 20% excess of free active hydrogen-containing groups relative to the blocked isocyanate groups can be present. On occasion it may be advantageous to incorporate a slight excess of blocked isocyanate groups which provide some crosslinking in the finished product after heat-activation.

From about 0.05 to 1.1 moles, preferably 0.2 to 1.0 moles, of monofunctional blocking agent can be used per mole of excess diisocyanate remaining after reaction with the mixture of glycol and diol. By operating with these amounts of blocking agent, at least 45%, preferably 50% of the excess diisocyanate is available for reaction with the difunctional active hydrogen compound.

Preferably about 1.0 mole of difunctional active hydrogen compound is used per mole of excess diisocyanate remaining after the reaction with the mixture of glycol and diol, regardless of the quantity of blocking agent used within the range specified above. When less than 1.0 mole of monofunctional blocking agent is used per mole of excess diisocyanate, the difunctional active hydrogen compound is consumed by chain-extension as well as by end-group capping. The less blocking agent used, the greater the proportion of difunctional active hydrogen compound entering into chain extension. When amounts of blocking agent in excess of 1.0 mole per mole of excess diisocyanate are used, the quantity of difunctional active hydrogen compound used should be decreased accordingly. Conversely, if an amount of difunctional active hydrogen compound in excess of 1.0 mole per mole of excess diisocyanate is used, the amount of blocking agent should be reduced accordingly.

It should be noted that the same material can be employed, if desired, as the low molecular weight diol and the difunctional active hydrogen compound. As previously indicated, any of the low molecular weight diols described hereinbefore can be used as the difunctional active hydrogen compound.

Higher functionality can be introduced by replacing part of the diisocyanate, polymeric glycol, low molecular weight diol or difunctional active hydrogen compound with up to 10 mole %, based on the total diisocyanate used, of a chemically equivalent amount of reactants having a functionality greater than two. The products resulting from this modification are thermosetting as a result of the branching introduced.

The mechanical process steps which are used to produce the heat-activatable polyurethane powders of this invention involve emulsifying one or more of the reactants (usually a mixture of the glycol, diol and blocking agent) with the aid of a surfactant in an inert solvent in which at least one of said reactants is immiscible and adding a second reactant (usually the diisocyanate) which is miscible with or relatively soluble in the inert solvent. Finally the difunctional active hydrogen compound is reacted with the excess isocyanate still present. The product so produced is obtained directly as a fine powder, the particle size of which is largely determined by the size of the droplets present in the initial emulsion. This process produces particles each of which contains about equivalent amounts of blocked isocyanate groups and active hydrogen groups. Similar process steps are employed in preparing two-part powders.

Organic liquids for use as the continuous phase of the emulsion may be any liquid not reactive with the reactants, e.g., not reactive with —NCO or with active hydrogens, and in which at least one of the reactants and the reaction product are immiscible and insoluble.

It is ordinarily desired that such liquids be volatile for removal from the reaction product by evaporation at temperatures which will not harm the product and that the boiling point be above the desired reaction temperature. Liquids with lower boiling points may be used but may require the use of pressure vessels to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling point or boiling range, preferably between about 65°C. and about 200°C. such as hydrocarbons, halogenated hydrocarbons, ethers . . . may be used. Hydrocarbon liquids, preferably aliphatic hydrocarbon liquids, such as petroleum fractions, have been found desirable because of their low cost, inertness to the reactants and ease and completeness of removal from the reaction product. Preferred solvents for the present invention are $C_6$–$C_{10}$ saturated aliphatic hydrocarbons or mixtures thereof.

The surfactants employed in the present process are preferably nonionic polymeric materials having molecular weights in excess of 1,000 characterized in that they contain nonpolar moieties such as hydrocarbon radicals and highly polar moieties such as amide, ester or carbonyl groups.

A preferred class of such surfactants are the products of simultaneous polymerization and alkylation with alpha-olefins of heterocyclic N-vinyl monomers. These may be prepared by treating (a) one mole of such monomer alone, or one mole of a mixture of two such monomers, or one mole of a mixture containing such monomer and a non-heterocyclic polymerizable, monoethylenically unsaturated monomer, with (b) 0.05 to 12 moles of an $\alpha$-olefin, in a solution of an organic solvent common to the monomer or monomers and the $\alpha$-olefin, in the presence of 0.025 to 0.30 mole of an organic peroxide catalyst per mole of $\alpha$-olefin, at a temperature ranging from 80° to 200°C. for 3 to 60 hours. The resulting solution of alkylated polymer may be employed as such or, if desired, the organic solvent may be removed by vacuum distillation.

Especially preferred surfactants are the products of copolymerizing N-vinyl-2-pyrrolidone with an alpha-olefin having four to 20 carbon atoms to give copolymers having alkyl side chains of from two to 18 carbon atoms, the proportion of alkylated olefin being in the range of from about 10% to about 80% with molecular weight of at least 1000 and preferably above 4,000, have been found to be particularly effective surfactants. The quantity of surfactant used will depend on a variety of factors including the physical properties of the reactants and of the inert liquid medium, the time required for the reaction, the efficiency of the emulsifying equipment, the size of reaction product particle desired, and so on. In general, from about 0.5% to about 10% of surfactant based on the total weight of reactants will be used.

The useful surfactants are by no means limited to the specific ones just described. An emulsion of fine droplets of an insoluble liquid reactant for the production of finely divided polyurethane particles can be prepared using a polymeric surfactant one part of which is solvated by the inert liquid reaction medium and the other part of which is associated with the reactant droplets. For example, in order to emulsify 1,4-butanediol in heptane, one might choose as surfactant a copolymer made from two types of monomer, (a) one like vinyl pyrrolidone, N,N-dimethyl acrylamide, etc., which, if homopolymerized, would be highly compatible with 1,4-butanediol and (b) one like vinyl stearate, lauryl methacrylate, a long chain alpha-olefin, etc., which, if homopolymerized, would be highly compatible with heptane. Furthermore, the molecular weight of the copolymer and the mole ratio of its monomeric constituents would be such that it would be somewhat more solvated by the heptane than by the 1,4-butanediol so that the heptane would be the external phase.

The quantity of surfactant used may range from about 0.5 to 10% by weight based on the total weight of reactants employed. Generally the surfactant will be used in amounts of 3–7% by weight based on the total weight of reactants.

Not only is the molar ratio of polar to nonpolar monomers important, but also the distribution of monomers in the copolymer, that is, whether the copolymer has a linear, graft or block structure. If the polar monomer contains a group such as nitrile, tertiary amine, lactam, etc., which can form strong dipole interactions with polar groups in the reactants or reaction product, a linear copolymer structure will often be adequate. However, if the polar monomer contains groups such as esters which will form only weak interactions with ester or ether groups in the reactants, then a graft or block structure is usually necessary so that by a multiplicity of such weak bonds, an adequate association can be brought about between the surfactant and the internal phase of the reaction mixture. Homopolymers composed of monomers having both polar and nonpolar moieties can also be used. N-vinyl-3-octadecyl pyrrolidone, N-vinyl-5-dodecyl-3-morpholinone, 1-hexadecylacrylonitrile, and N,N-dioctylaminoethyl methacrylate are examples of such monomers.

As previously indicated, the present invention contemplates heat-activatable polyurethane powder compositions ranging from those in which each particle contains about equivalent amounts of blocked isocyanate groups and active hydrogen-containing groups to those in which two types of particles (one containing blocked —NCO groups, the other active hydrogens) in chemically equivalent amounts are present. Systems which lie between these extremes are obviously possible but in general offer no advantage. The two extremes, called one- and two-part systems for convenience, in general provide equivalent products when heat-activated. Both the one- and two-part systems are stable during storage at room temperature over extended periods of time.

Preparation of compositions representative of the one-part system preferably is accomplished by emulsifying the polymeric glycol, the low molecular weight diol if any is used, and the monofunctional blocking agent with the aid of a surfactant in the inert organic liquid. In order to produce and emulsion, it is understood that the mixture of glycol, diol and blocking agent must be liquid under the conditions used. The required excess of diisocyanate is added and reaction is allowed to proceed substantially to completion. The reaction rate can be controlled by adjusting the temperature and/or by using urethane-forming catalysts. Optionally, the monofunctional blocking agent can be added separately following reaction of the diisocyanate with the glycol and diol. Finally, the reaction mixture is added to the difunctional active hydrogen compound and allowed to react. Optionally, the difunctional active hydrogen compound can be added to the reaction mass. Powdered product is isolated from the resulting dispersion by conventional means such as decantation, filtration or centrifugation. It is normally washed with the same solvent used during the reactions to remove residual surfactant and catalyst if present. The product is then dried at temperatures well below those required for heat-activation. In most cases this means drying at temperatures of less than 120°C. and preferably below 80°C.

Preparation of two-part systems involves carrying out the reaction between polymeric glycol (optionally plus diol) and diisocyanate as described for the one-part system. The resulting reaction product containing free —NCO groups is reacted with an equivalent amount of monofunctional blocking agent or two equivalents of difunctional active hydrogen compound to provide powders containing either blocked —NCO groups or active hydrogen-containing groups. In a preferred embodiment, the component containing the blocked isocyanate groups is prepared by adding the diisocyanate to an emulsion containing the blocking agent as well as the glycol and diol. A two-part system results when chemically equivalent amounts of the two types of powders are mixed uniformly. Obviously the initial NCO-terminated urethane used to prepare one part can differ from the initial NCO-terminated urethane used for the preparation of the second part if desired.

It has been found useful with some products to incorporate a finely-divided solid material such as talc, fumed silica or a pigment to improve the flow properties of the powdered product. Such additives generally improve filtration during product isolation and therefore are preferably added at any stage prior to filtration including addition along with the starting materials. They can of course be added to the dry powder. Other additives such as antioxidants, UV-absorbers, other stabilizers, flow promoters, etc., can be incorporated by the same techniques.

Bead-shaped particles having average sizes of about 200 microns to as low as about 10 microns can be produced by the procedures described hereinbefore. Particle size is largely controlled by the nature and amount of surfactant, intensity of agitation and of temperature employed during the reaction. For a given system and set of equipment, particle size is reduced when the amount of surfactant is increased and vice versa. Particles in this size range are well suited for a variety of powder-coating techniques such as fluidized bed, electrostatic spray, powder flow coating, and heat-fused coatings for flexible substrates. The powders are also useful as hot-melt adhesives. Typically the powder is applied to the desired surface in pigmented form and heated to its activating temperature, causing the blocked ends of the polyurethane to split off and regenerate the blocking agent, e.g. phenol, and the NCO-terminated polyurethane; the latter then reacts with the $NH_2$-terminated or OH-terminated end of an adjacent molecule to form a high molecular weight polymer.

The powders of this invention can be activated at temperatures ranging from 110°C. to 230°C. The preferred temperature for a given system in a given application largely depends on the melting point of the powder, the dissociation temperature of the blocked isocyanate groups, the reactivity of the active hydrogen-containing groups and the nature of the substrate. In most commercial applications temperatures of 140° to 210°C. will be satisfactory. The preferred compositions of this invention yield rapid cures at 170° to 200°C. without significant decomposition. The temperatures stated refer to the actual temperature of the melt.

Much higher temperatures may be required in air or other media in contact with the polymer to raise its temperature quickly.

The fusion conditions also depend on the melt flow properties of the particular powder to a large extent. As previously indicated prior art polyurethane powders are high molecular weight polymers which consequently exhibit high melt viscosities even at temperatures approaching their decomposition points. In contrast, the powders of the present invention offer a combination of low melt viscosity at safe processing temperature and a high level of physical properties by virtue of their high molecular weights after curing. The instant powders exhibit melt viscosities generally 2- to 5-fold less than prior art polyurethanes having similar ultimate physical properties. It is obvious that the lower melt viscosity results in superior film formation and improved penetration of porous substrates.

EXAMPLES

The following ASTM methods were employed in determining the properties of the polymers prepared in the Examples which follow:

| | |
|---|---|
| Modulus at 100% elongation, $M_{100}$ | D412* |
| Modulus at 200% elongation, $M_{200}$ | D412* |
| Modulus at 300% elongation, $M_{300}$ | D412* |
| Tensile at Break, $T_B$ | D412* |
| Elongation at Break, $E_B$ | D412* |
| Split Tear | D470** |
| Melt Index | D1238*** |

* Cross-head speed 2'' (5.08 cm) per minute
** Modified by use of 1.5'' × 3'' (3.81 cm × 7.62 cm) sample with 1.5'' (3.81 cm) cut on the long axis of the sample. This configuration prevents "necking down" at the point of tearing. Cross-head speed 50'' (127 cm) per minute.
***2160 g. load.

Particle Size of the powders prepared in the following examples was determined by a Coulter Counter.

Melting Points reported were determined in capillaries using an electrothermally heated melting point apparatus.

Surfactant A was a copolymer of 20 parts by weight N-vinyl-2-pyrrolidone and 80 parts by weight α-eicosene, average molecular weight about 8600.

Surfactant B was a copolymer of 20 parts by weight N-vinyl-2-pyrrolidone and 80 parts by weight α-hexadecene, average molecular weight about 7300.

Surfactant C was a copolymer of 50 parts by weight N-vinyl-2-pyrrolidone and 50 parts by weight α-hexadecene, average molecular weight 9500.

EXAMPLE 1 (Preparation of a two-part heat-activated powder composition)

Composition A (Polyurethane containing ε-caprolactam-capped isocyanate end groups)

To a solution of 6.5 g Surfactant A in 550 ml n-heptane, 63.0 g polytetramethylene ether glycol (number average molecular weight 975, 0.064 mole), 32.0 g 1,4-butanediol (0.355 mole) and 7.8 g ε-caprolactam (0.069 mole) were added and emulsified by vigorous agitation at 70°C. After addition of 5 ml of a 5% solution of dibutyltin dilaurate in heptane 119.0 g 4,4'-methylenebis(cyclohexyl isocyanate) containing about 20% trans, trans isomer (0.454 mole) was charged to the reaction mixture over a period of about 7 minutes. During the isocyanate addition, external cooling was applied to maintain the reaction temperature at 80°–85°C. After heating for three hours at 85°C. the reaction was completed and the slurry of finely divided particles was allowed to settle out by standing at room temperature for 10 min. The supernatant liquid was decanted and the solids redispersed in 250 ml heptane. The reaction product was isolated by filtration, washed several times with heptane, and finally dried at 60°C.

The resulting powder was screened through a 35 mesh screen (13 meshes per lineal cm) and characterized as follows:

| | |
|---|---|
| Average particle size, μ | 45 |
| Melt index at 190°C. (g/10 min.) | 253 |
| Melting range, °C. | 154–159 |
| Calc. ε-caprolactam content, % | 3.52 |

Composition B (Polyurethane containing aliphatic amino end groups)

The general procedure given for the preparation of Composition A was essentially repeated except that the following starting materials were used:

550 ml n-heptane
6.5 g Surfactant A
97.5 g polytetramethylene ether glycol (0.1 mole)
30.5 g 1,4-butanediol (0.35 mole)
131.0 g 4,4'-methylenebis(cyclohexyl isocyanate) (20% trans, trans isomer 0.5 mole)
5 ml 5% catalyst solution (as above)

After addition of the diisocyanate the resulting slurry of finely divided solids was heated for 1 hour at 85°C. The free isocyanate groups of the polyurethane were then capped with 1,6-hexamethylene diamine by pouring the slurry into a dispersion of 11.6 g 1,6-hexamethylene diamine (0.1 mole) in 150 ml heptane in the presence of 1.5 g Surfactant A with vigorous agitation at 50°C. After stiring for 30 min. the reaction mixture was worked up as described above for Composition A.

The fine powder was screened through a 150 mesh screen (59 meshes per lineal cm) and characterized as follows:

| | |
|---|---|
| Average particle size, μ | 35 |
| Melt index at 190°C., g/10 min. | 64 |
| Melting range, °C. | 142–150 |
| Amino nitrogen content, % | 0.32 |

A heat-activated polyurethane composition was prepared by dry-blending 100 parts of Composition A and 134 parts of Composition B and rapidly curing by heating the mixture at 190°C. for 5 minutes to form a high molecular weight polymer having a melt index of 8.3 g/10 min. In a specific embodiment at 25 mil (0.64 mm) film was prepared by compression molding of the powder mixture (A & B) for 5 minutes in a hydraulic press at a platen temperature of 190°C., followed by rapid cooling. This film had the following properties:

| | |
|---|---|
| $M_{100}$, kg/cm$^2$ | 190 |
| $M_{200}$, kg/cm$^2$ | 315 |
| $M_{300}$, kg/cm$^2$ | 534 |
| $T_B$, kg/cm$^2$ | 583 |
| $E_B$, % | 320 |
| Split tear, kg/cm | 120 |

The dry-blended mixture of composition A and B was stable at room temperatures for at least 6 months.

To demonstrate the lower melt viscosity of the instant powder composition relative to the prior art, the flow characteristics were determined in a melt indexer. Four grams of the powder blend of this example was charged quickly to the indexer which was preheated to 190°C. After 2 minutes, the melt index was 28.5 g/10 min. which corresponds to a calculated melt viscosity of 4,150 poise. In this test, a prior art polyurethane powder, containing polytetramethylene ether glycol, butanediol-1,4 and 4,4'-methylenebis (cyclohexyl isocyanate) in the molar ration of 1.0:5.0:6.0 respectively, exhibited a melt index of 7.1 g/10 min. which corresponded to a calculated melt viscosity of 16,750 poise. After 5 minutes in the indexer both polymers exhibited substantially the same melt index.

EXAMPLE 2

A. In this Example a one-part heat-activated powder composition based on the same principle as the two-part polyurethane system disclosed in Example 1 was prepared. The general procedure used for the preparation of the polyurethane powder compositions of Example 1 was essentially repeated except that the following starting materials were used:

```
1100 ml n-heptane
23.5 g Surfactant A
195 g polytetramethylene ether glycol (0.2 mole)
36.0 g 1,4-butanediol (0.4 mole)
11.3 g ε-caprolactam (0.1 mole)
209.6 g 4,4'-methylenebis(cyclohexyl isocyanate)
    (20% trans, trans isomer, 0.8 mole)
10 ml 5% catalyst solution (as described in Example 1)
```

The diisocyanate was added last at 80°–85°C. to the dispersion of above starting materials over a period of about 10 minutes. After agitation at 85°C. for one hour the resulting slurry of finely divided particles was cooled to 50°C. and poured into a dispersion of 23.2 g 1,6-hexamethylene diamine (0.2 mole) in a mixture of 1.5 g Surfactant A and 300 ml n-heptane, vigorously agitated at 50°C. The reaction was complete after agitating for 30 minutes at 50°C. The resulting reaction mixture was worked up according to the procedure given in Example 1.

The dried powder was screened through a 35 mesh screen (13 meshes per lineal cm) and characterized as follows:

| | |
|---|---|
| Average particle size, μ | 34 |
| Melting range, °C. | 134–148 |
| Amino nitrogen content, % | 0.29 |
| Melt index at 190° C., g/10 min. | 0.4 |

Since the sample is chain-extended under the conditions of the melt index determination (190°C./5 min.), the melt index is characteristic of the cured polymer.

A 25 mil (0.64 mm) film prepared by compression molding as described in Example 1 had the following properties:

| | |
|---|---|
| $M_{100}$, kg/cm$^2$ | 123 |
| $M_{200}$, kg/cm$^2$ | 193 |
| $M_{300}$, kg/cm$^2$ | 330 |
| $T_B$, kg/cm$^2$ | 503 |
| $E_B$, % | 390 |
| Split tear, kg/cm | 62.5 |

Similar properties were obtained on a 5 to 7 mil (0.13 to 0.18 mm) film prepared by spraying the powder electrostatically onto release paper and fusing in a 200°C. oven for 3 minutes.

Prior to heat-activation, the powder was stable at room temperature for at least 6 months.

B. The procedure of part A was repeated with the exception that the amount of ε-caprolactum was increased to 22.6 grams (0.2 moles). The resulting powder had a melt index at 190°C. of 9.8 g/10 minutes. The powder was formed into a 25 mil (0.64 mm) film by compression molding as described in Example 1. The film had the following properties:

| | |
|---|---|
| $M_{100}$, kg/cm$^2$ | 139 |
| $M_{200}$, kg/cm$^2$ | 190 |
| $M_{300}$, kg/cm$^2$ | 243 |
| $T_B$, kg/cm$^2$ | 281 |
| $E_B$, % | 390 |
| Split tear, kg/cm | 64.3 |

EXAMPLE 3

The procedure given in Example 2 was essentially repeated except that 8.72 g 2-butanone oxime (0.1 mole) was used instead of 11.3 g ε-caprolactam as a capping agent.

A 25 mil (0.64 mm) film prepared under the same conditions as described in Example 1 had the following properties:

| | |
|---|---|
| $M_{100}$, kg/cm$^2$ | 136 |
| $M_{200}$, kg/cm$^2$ | 197 |
| $M_{300}$, kg/cm$^2$ | 292 |
| $T_B$, kg/cm$^2$ | 334 |
| $E_B$, % | 350 |
| Split tear, kg/cm | 41.1 |

EXAMPLE 4

A heat-activated polyurethane powder was prepared according to the procedure given in Example 2 from the following starting materials:

```
550 ml n-heptane
6.5 g Surfactant A
5.65 g ε-caprolactam (0.05 mole)
97.5 g polytetramethylene ether glycol (0.1 mole)
17.55 g 1,4-butanediol (0.195 mole)
0.4 g trimethylolpropane (0.003 mole)
104.8 g 4,4'-methylenebis(cyclohexyl isocyanate)
    (20% trans, trans isomer, 0.4 mole)
5.0 ml 5% catalyst solution of Example 1
```

The cappinng reaction was carried out by pouring the reaction mixture resulting from above starting materials into a dispersion of 11.6 g 1,6-hexamethylene diamine (0.1 mole) in a mixture of 150 ml n-heptane and 1.5 g Surfactant A.

The isolated polyurethane powder had a melting range of 128°–136°C. and an amino nitrogen content of 0.35%.

The physical properties of a 25 mil (0.64 mm) film prepared according to the procedure in Example 1 was as follows:

| | |
|---|---|
| $M_{100}$, kg/cm$^2$ | 137 |
| $M_{200}$, kg/cm$^2$ | 204 |
| $M_{300}$, kg/cm$^2$ | 302 |
| $T_B$, kg/cm$^2$ | 323 |
| $E_B$, % | 320 |
| Split tear, kg/cm | 51.8 |

After aging for 2 weeks immersed in water at 100°C. the following properties were measured:

| | |
|---|---|
| $M_{100}$, kg/cm$^2$ | 134 |
| $M_{200}$, kg/cm$^2$ | 190 |
| $T_B$, kg/cm$^2$ | 225 |
| $E_B$, % | 250 |

EXAMPLE 5

The procedure given in Example 2 was essentially repeated except that the following starting materials were used:

```
550 ml n-heptane
2.1 g Surfactant B
4.9 g Surfactant C
114.5 g polybutylene adipate glycol
    (number average molecular weight 1145, 0.1 mole)
18.0 g 1,4-butanediol (0.2 mole)
5.65 g ε-caprolactam (0.05 mole)
104.8 g 4,4'-methylenebis(cyclyhexyl isocyanate)
    (20% trans, trans isomer, 0.4 mole)
10 ml 5% catalyst solution of Example 1
```

For the capping reaction a dispersion of 11.6 g 1,6-hexamethylene diamine(0.1 mole) in a mixture of 150 ml n-heptane and 1.5 g Surfactant A was used.

The isolated polyurethane powder had a melting range of 131°–142°C. and an amino nitrogen content of 0.20%. The average particle size was 48 μ.

A 25 mil (0.64 mm) compression molded film prepared according to the procedure of Example 1 had the following physical properties:

| | |
|---|---|
| Melt index (190° C.), g/10 min. | 14.5 |
| $M_{100}$, kg/cm² | 101 |
| $M_{200}$, kg/cm² | 151 |
| $M_{300}$, kg/cm² | 256 |
| $T_B$, kg/cm² | 387 |
| $E_B$, % | 420 |
| Split tear, kg/cm | 112 |

EXAMPLE 6

A heat-activated polyurethane powder composition was prepared from the following starting materials according to the procedure given in Example 2:

```
550 ml n-heptane
12.0 g Surfactant B
97.5 g polytetramethylene ether glycol (0.1 mole)
27.0 g 1,4-butanediol (0.3 mole)
11.3 g ε-caprolactam (0.1 mole)
125.0 g 4,4'-methylenebis(phenyl isocyanate)(0.5 mole)
5 ml 5% catalyst solution of Example 1
```

The free isocyanate groups of the resulting finely divided polyurethane particles were capped with 1,4-butanediol by pouring the slurry into a dispersion of 9.0 g 1,4-butanediol (0.1 mole) in a mixture of 100 ml n-heptane and 1.0 g Surfactant B with vigorous agitation at 85°C. After heating for 1 hour at 85°C., the polyurethane powder was isolated as described hereinbefore.

A 25 mil (0.64 mm) film prepared by compression molding at 190°C. as described in Example 1 had the following properties:

| | |
|---|---|
| Melt index (190° C.), g/10 min. | 0.48 |
| $M_{100}$, kg/cm² | 152 |
| $M_{200}$, kg/cm² | 162 |
| $M_{300}$, kg/cm² | 177 |
| $T_B$, kg/cm² | 190 |
| $E_B$, % | 360 |
| Split tear, kg/cm | 19.6 |

I claim:

1. In a process of forming a heat-activatable polyurethane powder characterized by low-melt viscosity upon initial melting, and in which powder the particles are essentially bead-like in form, the improvement wherein
   1. the melt viscosity is achieved by preparing a reaction product of
       a. one mole of a polymeric glycol having a molecular weight of 400–4,000,
       b. X moles of a diol having a molecular weight of less than 250 wherein X equals 0–20,
       c. Y moles of an organic diisocyanate wherein Y equals 1.03 (1 + X) to 1.60 (1 + X),
       d. 0.03 (1 + X) to 0.60 (1 + X) moles of a monofunctional isocyanate blocking agent, and
       e. Y - X - 1 moles of a difunctional active hydrogen compound, wherein
   2. the heat-activatable property is achieved by selecting the amounts of reactants (d) and (e) so that the polyurethane powder contains about stoichiometric amounts of blocked —NCO groups and active hydrogen-containing groups, and wherein
   3. the size and shape of bead particle is achieved by initially emulsifying reactants (a) and (b) in an inert organic solvent with the aid of a surfactant, followed by converting said emulsion to a dispersion of finely divided polyurethane beads and recovering the latter.

2. The process of claim 1 wherein said polymeric glycol is selected from the group consisting of a poly(alkylene oxide) glycol and a polyester glycol.

3. The process of claim 2 wherein said polymeric glycol is poly(tetramethylene oxide) glycol.

4. The process of claim 2 wherein said polymeric glycol is poly(ε-caprolactone) glycol.

5. The process of claim 1 wherein said diol is an acyclic or alicyclic diol.

6. The process of claim 5 wherein said diol is an aliphatic diol selected from the group consisting of 1,4-butanediol, ethylene glycol, neopentyl glycol, 1,6-hexanediol and diethylene glycol.

7. The process of claim 1 wherein said diisocyanate is selected from the group consisting of an aromatic, an aliphatic, and a cycloaliphatic diisocyanate.

8. The process of claim 7 wherein said diisocyanate is selected from the group consisting of 2,4-tolylene diisocyanate, optionally containing up to about 50% 2,6-tolylene diisocyanate, 4,4'-methylenebis(phenyl isocyanate), and 4,4'-methylenebis(cyclohexyl isocyanate).

9. The process of claim 1 wherein said monofunctional blocking agent is an active hydrogen compound selected from the group consisting of an aromatic hydroxy compound, an oxime, an enol, a lactam, and a diaryl amine.

10. The process of claim 9 wherein said blocking agent is either epsilon-caprolactam or methyl ethyl ketoxime.

11. the process of claim 1 wherein said difunctional active hydrogen compound is selected from the group consisting of a low molecular weight diol, a diamine and an amino-alcohol.

12. The process of claim 11 wherein said diamine is selected from the group consisting of ethylene diamine, hexamethylene diamine, 4,4'-methylenebis (cyclohexyl amine) and 1,3-phenylene diamine.

13. The process of claim 1 wherein said inert organic liquid is a $C_6$–$C_{10}$ saturated aliphatic hydrocarbon.

14. The process of claim 1 wherein said surfactant is a non-ionic polymer having a molecular weight in excess of 1,000 and containing both non-polar and highly polar moieties.

15. The process of claim 14 wherein said surfactant is a copolymer of vinyl pyrrolidone with an α-olefin having 4–20 carbon atoms.

16. A process for forming a heat-activatable polyurethane powder which comprises the steps of (1) emulsifying with the aid of a surfactant a polymeric glycol or a mixture thereof with a low molecular weight diol in an inert organic liquid, (2) contacting the emulsion with an organic diisocyanate, (3) allowing the diisocyanate to react with the polymeric glycol or the mixture thereof with said low molecular weight diol in the emulsion to form an NCO-terminated polyurethane dispersed in said inert liquid, (4) contacting the resulting dispersion with a monofunctional isocyanate blocking agent, (5) permitting the aforesaid monofunctional isocyanate blocking agent to react with not more than about half of the —NCO groups of the dispersed polyurethane to form a heat-activatable adduct, (6) contacting the resulting dispersion with a difunctional active hydrogen compound and then reacting a sufficient amount of the latter with the residual —NCO groups of said polyurethane to provide the polyurethane with free active hydrogen-containing groups, and (7) separating the dispersed polyurethane as a finely divided powder, the particles of said powder providing about stoichiometric amounts of blocked —NCO groups and of active hydrogen-containing groups, whereby when the powder is heated the —NCO groups which are blocked will be regenerated and react with said free active hydrogen-containing groups.

17. A process for forming a heat-activatable polyurethane powder comprising the steps of (1) emulsifying with the aid of a surfactant a polymeric glycol, or a mixture thereof with a low molecular weight diol, and a monofunctional isocyanate blocking agent in an inert organic liquid, (2) contacting the resulting emulsion with an organic diisocyanate, (3) allowing the diisocyanate to react with the polymeric glycol or the mixture thereof with said diol, and with said monofunctional isocyanate blocking agent to form a dispersion of polyurethane in which some of the —NCO groups are still present, (4) contacting the resulting dispersion with a difunctional active hydrogen compound and then reacting a sufficient amount of the latter with the —NCO groups of the dispersed polyurethane to provide the polyurethane with free active hydrogen-containing groups, and (5) separating the dispersed polyurethane as a finely divided powder, the particles of said powder providing about stoichiometric amounts of blocked —NCO groups and of active hydrogen-containing groups, whereby when the powder is heated the —NCO groups which are blocked will be regenerated and react with said free active hydrogen-containing groups.

18. The process of claim 17 in which said surfactant is a copolymer of N-vinyl-2-pyrrolidone and an α-olefin and has a molecular weight about 4000, and the inert organic liquid is a saturated aliphatic hydrocarbon.

19. The process of claim 17 in which said inert organic liquid is a liquid saturated aliphatic hydrocarbon and the surfactant is a member selected from the group consisting of (a) a copolymer of 20 parts by weight N-vinyl-2-pyrrolidone and 80 parts by weight α-eicosene having an average molecular weight of about 8600, (b) a copolymer of 20 parts by weight N-Vinyl-2-pyrrolindone and 80 parts by weight α-hexadecene, average molecular weight about 7300, and (c) a copolymer of 50 parts by weight N-vinyl-2-pyrrolidone and 50 parts by weight α-hexadecene, average molecular weight about 9500.

20. In a process for forming a heat-activatable polyurethane powder composed of a mixture of two separate types of particles, one type having blocked —NCO groups and the other type having terminal active hydrogen-containing groups, so that the said mixture provides chemically equivalent amounts of each type, the improvement comprising forming the first type of particles by the steps of (1) emulsifying with the aid of a surfactant a polymeric glycol or a mixture thereof with low molecular weight diol in an inert organic liquid, (2) contacting the emulsion with an organic diisocyanate, (3) allowing the diisocyanate to react with the polymeric glycol or the mixture thereof with said low molecular weight diol in the emulsion to form an NCO-terminated polyurethane dispersed in said inert organic liquid, (4) contacting the resulting dispersion with monofunctional isocyanate blocking agent, (5) permitting the latter to react with essentially all of the —NCO groups of the dispersed polyurethane to form a heat-activatable adduct, and (6) separating the dispersed polyurethane as a finely divided powder characterized in that the powder is heated said adduct will dissociate and the —NCO groups will be regenerated.

21. In a process for forming a heat-activatable polyurethane powder composed of a mixture of two separate types of particles, one type having blocked —NCO groups and the second type having active hydrogen-containing groups, so that the said mixture provides chemically equivalent amounts of each type, the improvement comprising forming the second type of particles by the steps of (1) emulsifying with the aid of a surfactant a polymeric glycol or a mixture thereof with a low molecular weight diol in an inert organic liquid, (2) contacting the emulsion with an organic diisocyanate, (3) allowing the diisocyanate to react with the polymeric glycol or the mixture thereof with said low molecular weight diol in the emulsion to form an NCO-terminated polyurethane dispersed in said organic liquid, (4) contacting the resulting dispersion with an excess of a difunctional active hydrogen compound to react the latter with the —NCO groups of the dispersed polyurethane to provide terminal active hydrogen-containing groups, and (5) separating the resulting product as a finely divided powder.

22. In a process for forming a heat-activatable polyurethane powder composed of a mixture of two separate types of particles, one type having blocked —NCO groups, and the second having terminal active hydroxyl-containing groups, so that the said mixture provides chemically equivalent amounts of each type, the improvement comprising forming the first type of particles by the steps of
1. mixing a polymeric glycol, or a mixture thereof with a diol and a monofunctional isocyanate blocking agent in an inert organic liquid in which said polymeric glycol, or the mixture thereof with said diol is insoluble and forming an emulsion thereof with the aid of the surfactant,
2. contacting the resulting emulsion with an organic diisocyanate,
3. allowing the diisocyanate to react with the polymeric glycol, or the mixture thereof with said diol, and with said monofunctional isocyanate blocking agent to form a dispersion of polyurethane containing blocked —NCO groups and 4. separating the resulting product as a finely divided powder, characterized in that when the powder is heated some —NCO groups will be regenerated.

23. A process of forming a heat-activatable polyurethane powder adapted for use in applying a flexible film to a substrate and characterized by low-melt viscosity upon initial melting and in which powder the particles are essentially bead-like in form, comprising
1. adding to a solution of non-ionic surfactant in n-heptane a mixture of poly(tetramethylene ether) glycol, 1,4-butane diol, and epsilon-caprolactam and agitating so as to form an emulsion of the glycol, diol, and the epsiloncaprolactam in the n-heptane,
2. adding to the resulting emulsion 4,4'-methylene bis(cyclohexyl isocyanate) with further agitation and in an amount which is in stoichiometric excess of that required to react with the components of the emulsion, initiating a reaction between said isocyanate and said emulsion components to form a dispersion of polyurethane beads having both terminal —NCO groups and —NCO groups which have reacted with said epsilon-caprolactam to form blocked —NCO groups,
3. contacting the aforesaid dispersion with 1,6-hexamethylenediamine with agitation and for a time and temperature sufficient to permit it to react with said terminal —NCO groups, and
4. recovering the resultant product as a finely divided powder which provides about equal amounts of terminal amino groups and blocked —NCO groups, said powder being in the form of beads which are adapted for use in powder coating processes.

24. A heat-activatable polyurethane powder prepared by the process of claim 1.

25. A heat-activatable polyurethane powder prepared by the process of claim 16.

26. A heat-activatable polyurethane powder prepared by the process of claim 17.

27. A heat-activatable polyurethane powder prepared by the process of claim 23.

28. A polyurethane powder prepared by the process of claim 20.

29. A polyurethane powder prepared by the process of claim 21.

30. A polyurethane powder prepared by the process of claim 22.

* * * * *

UNITED STATES PATENT OFFICE
CERTIFICATE OF CORRECTION

PATENT NO. : 3,933,759  Page 1 of 2
DATED : January 20, 1976
INVENTOR(S) : Guenther Kurt Hoeschele It is certified that error appears in the above-identified patent and that said Letters Patent are hereby corrected as shown below:

Column 3, Line 30 - ")isocyanate)," should be -- isocyanate), --

Column 3, Line 36 - "cyclyhexl lisocyanate" should be -- cyclohexyl isocyanate --

Column 3, Line 37 - "1-methyl-2-4-" should be -- 1-methyl-2,4- --

Column 3, Lines 37 & 38 - Expression beginning with "hydrogenation" and ending with "polymeric" should be moved to line 6, between "saturated" and "glycols."

Column 3, Line 56 - "napththalene" should be -- naphthalene --

Column 7, Line 54 - "and" should be -- an --

Column 10, Line 35 - "stiring" should be -- stirring --

Column 11, Line 68 - "caprolactum" should be -- caprolactam --

UNITED STATES PATENT OFFICE
CERTIFICATE OF CORRECTION

PATENT NO. : 3,933,759

DATED : January 20, 1976

INVENTOR(S) : Guenther Kurt Hoeschele

It is certified that error appears in the above-identified patent and that said Letters Patent are hereby corrected as shown below:

Column 12, Line 44 - "cappinng" should be -- capping --

Column 13, Line 13 - "cyclyhexyl" should be -- cyclohexyl --

Column 14, Claim 11, Line 55 - "the" should be -- The --

Column 15, Claim 19, Line 66 - "pyrrolindone" should be -- pyrrolidone --

Column 17, Claim 23, Line 13 - "epsiloncaprolactam" should be -- epsilon-caprolactam --

Signed and Sealed this first Day of June 1976

[SEAL]

Attest:

RUTH C. MASON
Attesting Officer

C. MARSHALL DANN
Commissioner of Patents and Trademarks